United States Patent
Kang et al.

(10) Patent No.: US 9,332,440 B2
(45) Date of Patent: ***May 3, 2016

(54) METHOD OF FREQUENCY CHANNEL ASSIGNMENT USING EFFECTIVE SPECTRUM SENSING IN MULTIPLE FREQUENCY ASSIGNMENT SYSTEM

(75) Inventors: Bub Joo Kang, Daejeon (KR); Myung Sun Song, Daejeon (KR); Chang Joo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,049

(22) Filed: Aug. 13, 2012

(65) Prior Publication Data

US 2012/0307782 A1    Dec. 6, 2012

Related U.S. Application Data

(62) Division of application No. 12/089,948, filed as application No. PCT/KR2006/004123 on Oct. 13, 2006, now Pat. No. 8,279,767.

(30) Foreign Application Priority Data

Oct. 14, 2005   (KR) ................. 10-2005-0097113
Oct. 10, 2006   (KR) ................. 10-2006-0098640

(51) Int. Cl.
*H04W 16/14*       (2009.01)
*H04B 1/715*       (2011.01)
(Continued)

(52) U.S. Cl.
CPC ............ *H04W 16/14* (2013.01); *H04B 1/715* (2013.01); *H04W 72/06* (2013.01); *H04W 72/10* (2013.01); *H04W 16/10* (2013.01); *H04W 72/042* (2013.01); *H04W 72/085* (2013.01)

(58) Field of Classification Search
CPC . H04W 16/14; H04W 72/0406; H04W 84/12; H04W 72/085; H04W 16/10; H04W 52/242; H04W 52/243
See application file for complete search history.

(56) References Cited

U.S. PATENT DOCUMENTS 5,197,093 A    3/1993    Knuth et al.
5,606,727 A    2/1997    Ueda
(Continued)

FOREIGN PATENT DOCUMENTS

EP        1 248 477 A1    10/2002
JP        03-014329 A      1/1991
(Continued)

OTHER PUBLICATIONS

"Medium Access Control (MAC) and Physical (PHY) Specifications", ANSI/IEEE Std. 802.11, 1999 Edition, IEEE Computer Society, Oct. 14, 2003, pp. 29-52.
(Continued)

*Primary Examiner* — Jung Park
(74) *Attorney, Agent, or Firm* — Ladas & Parry LLP

(57) ABSTRACT

A method of assigning a frequency channel using efficient spectrum sensing in a multiple Frequency Assignment system includes a channel sensing process, wherein a base station of a secondary user classifies multiple frequency channels licensed to a primary user into a plurality of channel state sets according to usage states, periodically senses channel states by changing a sensing period according to the types of classified channel state sets, and manages the sensed channel states as frequency channel state set information; a channel state set broadcasting process; and a channel assigning process. Accordingly, a frequency channel can be assigned to a secondary user requesting channel assignment using frequency channel state set information without a primary user experiencing interference noise.

4 Claims, 4 Drawing Sheets

(51) Int. Cl.
*H04W 72/06* (2009.01)
*H04W 72/10* (2009.01)
*H04W 16/10* (2009.01)
*H04W 72/04* (2009.01)
*H04W 72/08* (2009.01)

(56) References Cited

U.S. PATENT DOCUMENTS

| | | | | |
|---|---|---|---|---|
| 5,883,887 | A | * | 3/1999 | Take et al. ............... 370/329 |
| 7,474,895 | B1 | * | 1/2009 | Jiang et al. ............... 455/447 |
| 2006/0083205 | A1 | | 4/2006 | Buddhikot et al. |
| 2006/0128309 | A1 | | 6/2006 | Dateki et al. |
| 2006/0198344 | A1 | * | 9/2006 | Teague et al. ............ 370/337 |
| 2008/0259811 | A1 | * | 10/2008 | Cordeiro et al. .......... 370/252 |

FOREIGN PATENT DOCUMENTS

| | | |
|---|---|---|
| JP | 10-285103 A | 10/1998 |
| JP | 2006-524931 A | 11/2006 |
| JP | 4777432 B2 | 7/2011 |
| WO | 00/74415 A1 | 12/2000 |
| WO | 2004/070988 A2 | 8/2004 |
| WO | 2004/098221 A1 | 11/2004 |
| WO | 2007/043827 A1 | 4/2007 |

OTHER PUBLICATIONS

Ma Wen, et al; "Radar detection for 802.11a systems in 5 GHz band", Wireless Communications, Networking and Mobile Computing, 2005. Proceedings. 2005 International Conference on; Sep. 23-26, 2005, vol. 1, pp. 492-494.

A. Ghasemi, et al; "Collaborative spectrum sensing for opportunistic access in fading environments", New Frontiers in Dynamic Spectrum Access Networks, 2005. DySPAN 2005. 2005 First IEEE International Symposium on; Nov. 8-11, 2005; pp. 131-136.

D. Cabric, et al; "Implementation issues in spectrum sensing for cognitive radios", Signals, Systems and Computers, 2004. Conference Record of the Thirty-Eighth Asilomar Conference on; Nov. 7-10, 2004, vol. 1, pp. 772-776.

S. Haykin; "Cognitive radio: brain-empowered wireless communications", IEEE Journal on Selected Areas in Communications, Feb. 2005; vol. 23, Issue 2; pp. 201-220.

N. Devroye, et al; "Cognitive multiple access networks", ISIT 2005 Proceedings. International Symposium on Information Theory 2005; Sep. 4-9, 2005; pp. 57-61.

USPTO NFOA mailed Jun. 22, 2011 in connection with U.S. Appl. No. 12/089,948.

USPTO FOA mailed Dec. 30, 2011 in connection with U.S. Appl. No. 12/089,948.

USPTO NOA mailed Jun. 5, 2012 in connection with U.S. Appl. No. 12/089,948.

International Search Report mailed Jan. 4, 2007; PCT/KR2006/004123.

Carl R. Stevenson, et al; "Functional Requirements for the 802.22 WRAN Standard", doc.: IEEE 802.22-05/0007r46; IPEEE P802.22 Wireless RANS; Sep. 2005; 49 pages.

* cited by examiner

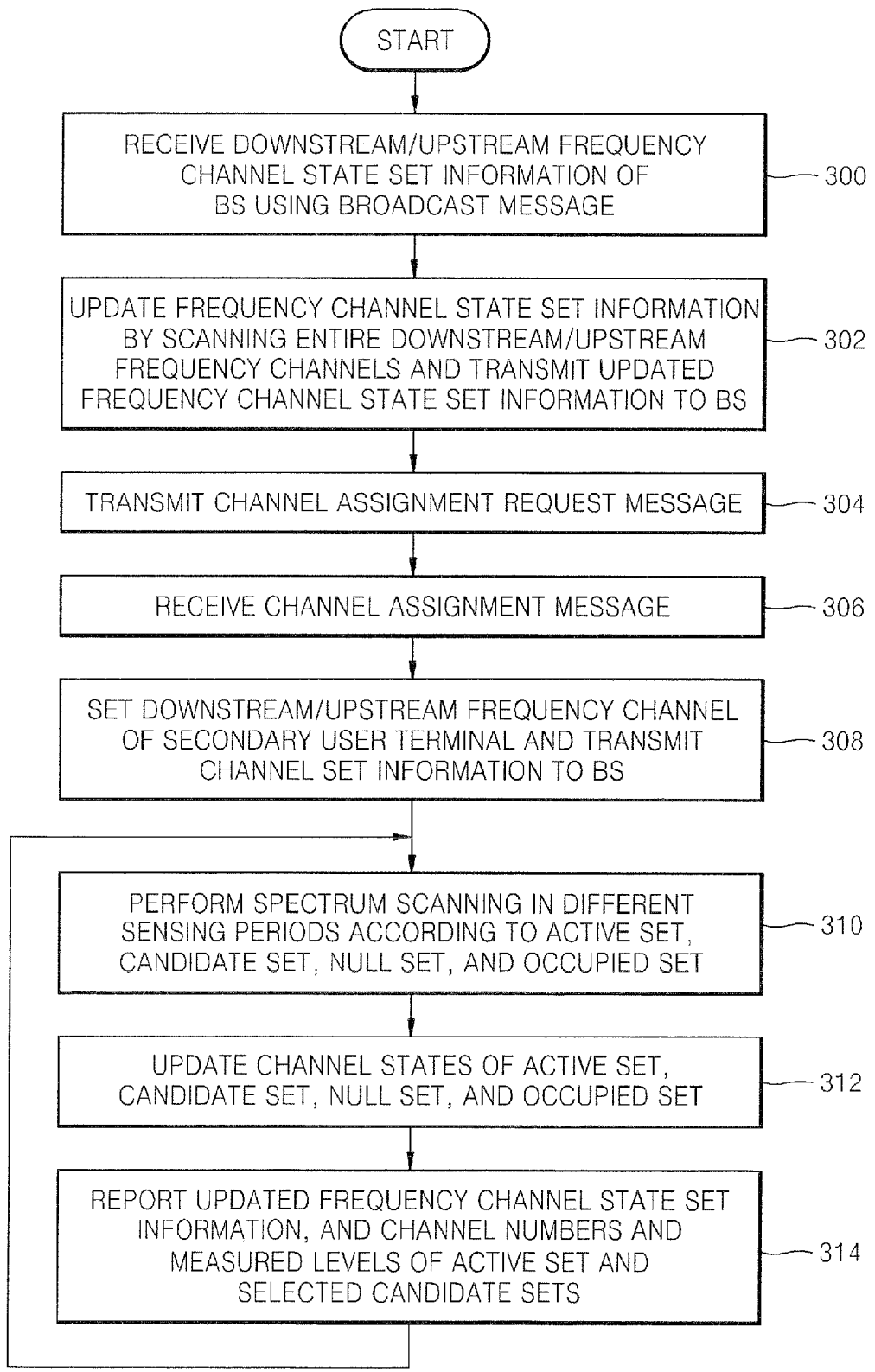

METHOD OF FREQUENCY CHANNEL ASSIGNMENT USING EFFECTIVE SPECTRUM SENSING IN MULTIPLE FREQUENCY ASSIGNMENT SYSTEM

CROSS-REFERENCE TO RELATED APPLICATION

The present application is a divisional of U.S. patent application Ser. No. 12/089,948 filed on Jan. 30, 2009, issued as U.S. Pat. No. 8,279,767 on Oct. 2, 2012, which is incorporated herein by reference in its entirety.

TECHNICAL FIELD

The present invention relates to a method of assigning a frequency channel using efficient spectrum sensing in a multiple Frequency Assignment (FA) system, and more particularly, to a method of assigning a frequency channel using efficient spectrum sensing in a multiple FA system, whereby a frequency channel is assigned to a secondary user, which requests channel assignment, using set information of channel states without a primary user experiencing interference noise while the multiple FA system classifies frequency channels that are licensed and allowed to the primary user into an active set, a candidate set, and an occupied set according to usage states and manages the classified frequency channels.

BACKGROUND ART

Demands of services using wireless communication are rapidly increasing, but frequency bands having good transmission characteristics and which are easy in terms of component development are already occupied. Thus, cognitive radio technology is used for a secondary user who desires to provide a new service using unused frequency channels found by temporally and spatially checking frequency channels that are licensed and allowed to a primary user. The primary user and the secondary user are communication systems operated by different services or operators and are described below.

The present invention corresponds to technology, which is being standardized by IEEE 802.22, and in more detail, functional requirements are being determined in order to create a standardization draft.

According to the IEEE 802.22 standardization, it is desired that a wireless Internet service is provided using time and space unused by the primary user of TV or wireless devices using a TV frequency band or a frequency band currently used for wireless microphone communication (e.g., a frequency band from 54 MHz to 698 MHz corresponding to TV channel numbers 2 to 51 in the United States, or a frequency band from 41 MHz to 910 MHz internationally). In order for an IEEE 802.22 system (a Base Station (BS), a Customer Premises Equipment (CPE), and a core network) to use the assigned TV frequency band, the BS of the secondary user and the CPE, which is a terminal of the secondary user, must know a current state of the frequency channels. To do this, the BS and the terminal of the secondary user always monitor a channel usage state by scanning the current TV frequency channels, i.e., the frequency band from 41 MHz to 910 MHz. Therefore, when the primary user desires to use a frequency channel being used by the secondary user, the secondary user can quickly hand over the frequency channel to the primary user.

As described above, the present invention is related to a method of sensing and managing frequency channels when 6, 7, or 8 MHz is set as a single frequency channel from the frequency band from 41 MHz to 910 MHz assigned to TV broadcasting in a multiple Frequency Assignment (FA) system, i.e., an IEEE 802.22 standard system, and is similar to Dynamic Frequency Selection (DFS) technology suggested by IEEE 802.16.

The DFS technology suggested by IEEE 802.16 is a technology of scanning for a wireless data communication service in an unlicensed bandwidth to determine whether frequency channels of a primary user are used, assigning a frequency channel unused by the primary user to the wireless data communication service, releasing the frequency channel from the wireless data communication service by using a BS according to a request of the primary user, and assigning a new channel to the wireless data communication service.

In this point of view, a technology field related to spectrum sensing in a multiple FA system according to an embodiment of the present invention is almost the same as the field of spectrum sensing technology of IEEE 802.22 and the DFS technology of IEEE 802.16.

However, in the conventional DFS technology of IEEE 802.16, in order to provide a wireless Internet service in an unlicensed bandwidth, a method used by a BS for requesting a terminal for measurement of a state of a selected frequency channel and receiving a measured result is used. In the conventional method, the BS only passively acquires information regarding the state of frequency channels licensed to a primary user, and thus, communication quality degradation and communication impediment of the primary user may occur due to a decrease in the reliability of the spectrum sensing in a process of assigning or changing a frequency channel to a new secondary user using the passively acquired state information, and data transmission efficiency may decrease due to an increase of an overhead signal such as a frequency channel state sensing request message.

Thus, in order to assign frequency channels licensed to a primary user to a new secondary user without affecting communication quality of the primary user, a BS of the secondary user must always maintain optimum information on the state of the frequency channels licensed to the primary user.

In order to do this, terminals and the BS of the secondary user must actively determine the state of the frequency channels licensed to the primary user using the spectrum sensing. In addition, for the spectrum sensing, instead of a simple periodic sensing method, an efficient method of changing a sensing period in consideration of whether the primary user uses the frequency channels is required.

DESCRIPTION OF THE DRAWINGS

The above and other features and advantages of the present invention will become more apparent by describing in detail exemplary embodiments thereof with reference to the attached drawings in which:

FIG. 4 is a flowchart illustrating a method of assigning a frequency channel using efficient spectrum sensing in a terminal of a secondary user according to an embodiment of the present invention.

DETAILED DESCRIPTION OF THE INVENTION

Technical Problem

Figure 1:
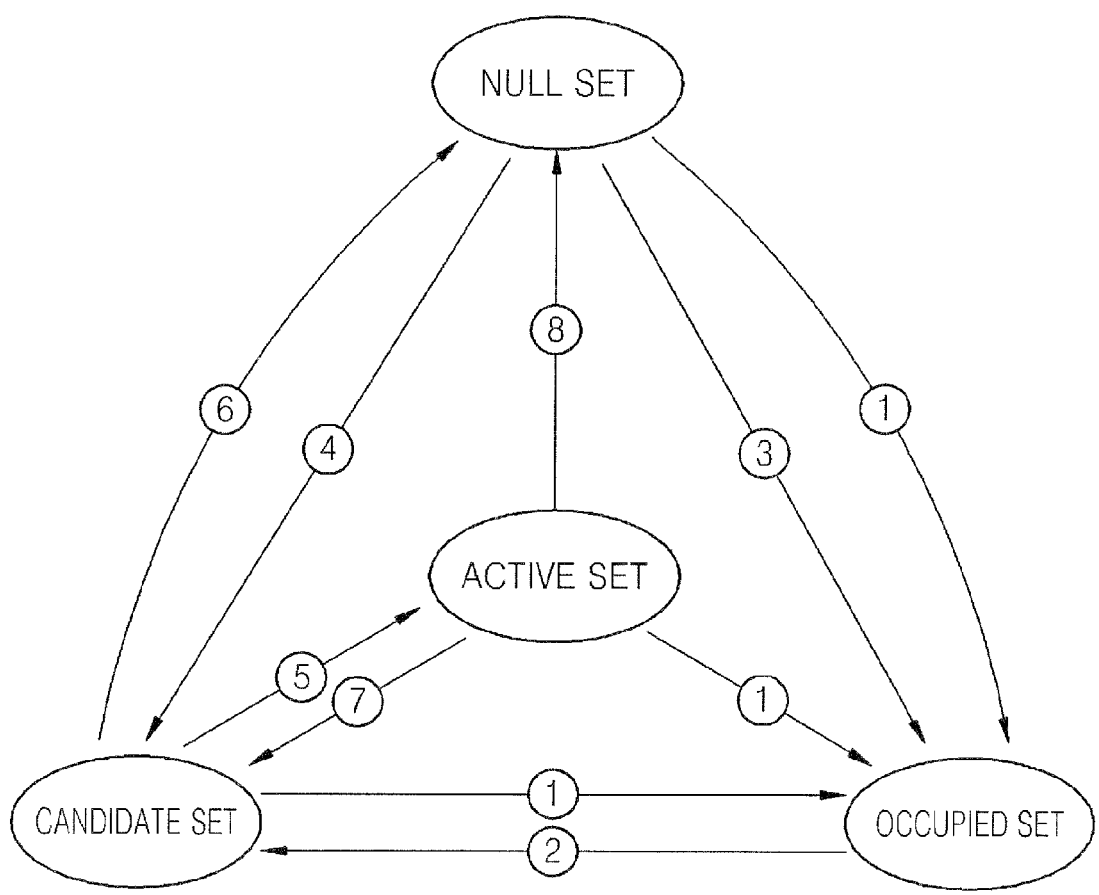
FIG. 1 is a channel state transition diagram according to 4 channel state sets to which an embodiment of the present invention is applied.

The present invention provides a method of assigning a frequency channel using efficient spectrum sensing in a multiple Frequency Assignment (FA) system, whereby a frequency channel is assigned to a secondary user, which requests channel assignment, using set information of channel states without a primary user experiencing interference noise while the multiple FA system classifies frequency channels that are licensed and allowed to the primary user into an active set, a candidate set, a null set, and an occupied set according to usage states and manages the classified frequency channels.

That is, the present invention provides a method of assigning a frequency channel using efficient spectrum sensing in a multiple FA system, whereby while the multiple FA system scans the state of multiple frequency channels (e.g., frequency channels of a TV frequency band from 41 MHz to 910 MHz), classifies the frequency channels into four types of sets (an active set, a candidate set, a null set, and an occupied set), and manages the classified frequency channels, a frequency channel unused by a primary user is detected and assigned at high speed to a secondary user requesting new frequency channel assignment, and if the appearance of the primary user is detected, the frequency channel is released a short time later.

Technical Solution

According to an aspect of the present invention, there is provided a channel assignment method applied to a Base Station (BS) of a secondary user to which a frequency channel licensed to a primary user is assigned in a multiple FA system, the method comprising: a channel sensing process, wherein the BS classifies multiple frequency channels licensed to the primary user into a plurality of channel state sets according to usage states, periodically senses channel states by changing a sensing period according to types of the classified channel state sets, and manages the sensed channel states as frequency channel state set information; a channel state set broadcasting process, wherein the BS transmits the frequency channel state set information managed in the channel sensing process to secondary user terminals using a broadcast message; and a channel assigning process, wherein if the BS receives a channel assignment request message from a new secondary user terminal which has received the broadcast message, the BS assigns an unused frequency channel from among frequency channels licensed to the primary user to the new secondary user terminal using the frequency channel state set information. The method may further comprise a channel state set information updating process, wherein the BS updates the frequency channel state set information by periodically receiving 'frequency channel state set information of the secondary user terminal' from the secondary user terminal to which the frequency channel is assigned.

According to another aspect of the present invention, there is provided a channel assignment method applied to a terminal of a secondary user to which a frequency channel licensed to a primary user is assigned in a multiple FA system, the method comprising: a channel state set information receiving process, wherein the secondary user terminal receives frequency channel state set information of multiple frequency channels licensed to the primary user from a BS of the secondary user using a broadcast message and manages the received frequency channel state set information; a channel assigning process, wherein the secondary user terminal requests the BS for channel assignment using the frequency channel state set information and the BS assigns an unused frequency channel from among frequency channels licensed to the primary user to the secondary user terminal; and a channel state set information reporting process, wherein the secondary user terminal periodically senses channel states of the multiple frequency channels licensed to the primary user by changing a sensing period according to types of channel state sets, updates the frequency channel state set information according to the sensing result, and reports the updated frequency channel state set information to the BS. The method may further comprise an updated information transmitting process, wherein after receiving the frequency channel state set information in the channel state set information receiving process, the secondary user terminal updates the received frequency channel state set information by scanning states of downstream/upstream frequency channels with the BS and transmits the updated frequency channel state set information to the BS.

Advantageous Effects

As described above, according to the present invention, there is provided technology related to a spectrum sensing process of detecting a usage state of a frequency channel of a primary user, interference noise power, and detecting the appearance of the primary user by performing spectrum sensing of frequency channels of a licensed bandwidth (e.g., a TV frequency band) of an existing system when a new multiple Frequency Assignment (FA) system, such as a Wireless Regional Area Network (WRAN) system, provides a wireless data communication service using the licensed bandwidth. The most important part of the technology is that the primary user must not experience communication quality degradation or communication impediment even though the new multiple FA system provides a wireless Internet service using the same frequency band.

Thus, unlike the prior art of requesting the scanning of a selected frequency channel, performing of spectrum sensing of the selected frequency channel, and reporting of a measured result, by using a periodic sensing method of classifying states of a plurality of frequency channels assigned to the new multiple FA system into four types of sets (an active set, a candidate set, a null set, and an occupied set) and varying a sensing period according to the classified types of sets, the number of signal messages related to the sensing can be reduced, the spectrum sensing can be performed at high speed, and channel assignment and channel change can be optimized using the four types of set information. That is, a frequency channel can be assigned to a new secondary user without the primary user experiencing interference noise.

Mode for Invention

The objectives, characteristics, and merits of the present invention will be described in detail by explaining preferred embodiments of the invention with reference to the attached drawings, so that those of ordinary skill in the art can easily implement the spirit and scope of the present invention. In the following description, well-known functions or constructions are not described in detail since they would obscure the invention with unnecessary detail. Hereinafter, the present invention will be described more fully with reference to the accompanying drawings, in which exemplary embodiments of the invention are shown.

The present invention will now be generally described.

According to an embodiment of the present invention, when a multiple Frequency Assignment (FA) system performs a new wireless data communication service in an unlicensed bandwidth or a licensed bandwidth (e.g., a TV frequency band), the multiple FA system classifies states of frequency channels into four types of sets (an active set, a candidate set, a null set, and an occupied set) and manages the classified frequency channels, wherein the multiple FA system efficiently manages the frequency channels by changing a sensing period according to the types of sets.

Table 1 illustrates the definition of channel state sets so as to aid understanding of the present invention.

TABLE 1

| | |
|---|---|
| First active set | A set of used channels for a certain Customer Premises Equipment (CPE) |
| Second active set | A set of used channels for a certain Base Station (BS) |
| Candidate/Backup set | A set of clean channels available for a certain CPE or BS |
| Occupied set | A set of occupied channels by incumbent user which a certain CPE finds |
| Disallowed set | A set of channels whose access are not allowed by regulation |
| Null set | A set of channels that are not classified as one of above five sets |

Table 1 will now be described. The active set indicates downstream/upstream frequency channels assigned to secondary user terminals. The active set includes the first active set and the second active set. The candidate set (although the term 'candidate/backup set' is used in Table 1, 'candidate set' will be used hereinafter) indicates downstream and upstream frequency channels unused by primary users and not assigned to any secondary user terminal (CPE). The occupied set indicates frequency channels being used by primary users.

Since the disallowed set is not often changed, the disallowed set is excluded from a channel management scenario.

That is, the channel state sets, i.e., the first active set, the second active set, the candidate set, the occupied set, and the null set, are defined for efficient management and managed by BSs and terminals of a secondary user. In detail, each BS manages the active set, the candidate set, the occupied set, and the null set, and each secondary user terminal also manages the active set, the candidate set, the occupied set, and the null set.

Each channel state set is updated in every sensing period of each channel set by the multiple FA system, and the minimum channel set update period is an active set sensing period.

In the present invention, the purpose of classifying frequency channels of a multiple FA system, such as a Wireless Regional Area Network (WRAN) system, into a plurality of types of sets as illustrated in Table 1 and managing the classified frequency channels in a BS is to vary a sensing period according to the states of the frequency channels and efficiently assign and change a frequency channel to each secondary user terminal.

According to a spectrum sensing method, a sensing period must be differently set according to the types of sets. For the active set, when primary users desire to use frequency channels assigned to secondary user terminals, the frequency channels must be released at high speed, and thus, the sensing period must be the shortest. For the candidate set, since usage states and measurement levels of frequency channels belonging to the candidate set must be scanned, the sensing period must be of intermediate length. For the occupied set, since frequency channels belonging to the occupied set are being used by primary users, the sensing period must be the longest.

FIG. 1 is a channel state transition diagram according to 4 channel state sets to which an embodiment of the present invention is applied. Transitions according to the reference numerals illustrated in FIG. 1 will now be described.

The transition according to reference numeral 1: frequency channels belonging to a null set, an active set, and a candidate set become elements of an occupied set when an incumbent service appears. That is, when the incumbent service appears, a secondary user system cannot use the frequency channels.

The transition according to reference numeral 2: when the quality of a frequency channel released from the incumbent service satisfies a specific quality threshold and is better than the quality of any element belonging to the candidate set, the released frequency channel becomes an element of the candidate set.

The transition according to reference numeral 3: when the quality of the frequency channel released from the incumbent service does not satisfy the specific quality threshold or is worse than the quality of all elements belonging to the candidate set, the released frequency channel becomes an element of the null set.

The transition according to reference numeral 4: when quality of an element belonging to the null set satisfies the specific quality threshold and is better than quality of any element belonging to the candidate set, the element belonging to the null set becomes an element of the candidate set.

The transition according to reference numeral 5: when an element of the candidate set is activated due to a new connection of a WRAN service, the element of the candidate set becomes an element of the active set.

The transition according to reference numeral 6: when the quality of an element belonging to the candidate set does not satisfy the specific quality threshold or is worse than the quality of elements which has become elements of the candidate set due to the transitions according to reference numerals 2, 4, and 7, the element belonging to the candidate set becomes an element of the null set.

The transition according to reference numeral 7: when the quality of an element of the active set, which has been released due to usage termination, satisfies the specific quality threshold and is better than the quality of any element belonging to the candidate set, the released element becomes an element of the candidate set.

The transition according to reference numeral 8: when the quality of a frequency channel released from the WRAN service does not satisfy the specific quality threshold or is worse than the quality of all elements belonging to the candidate set, the released frequency channel becomes an element of the null set.

In general, a quality threshold used to distinguish the candidate set from the null set according to a spectrum sensing result can be represented by an interference noise spectral density, and in reality, the quality threshold is determined as the magnitude of a specific noise spectral density for maintaining link quality of a WRAN uplink/downlink. Thus, since the specific quality threshold is determined from the performance of the WRAN uplink/downlink and a sensing receiver structure, in an embodiment of the present invention, a specific value cannot be suggested as the specific quality threshold.

Figure 2:
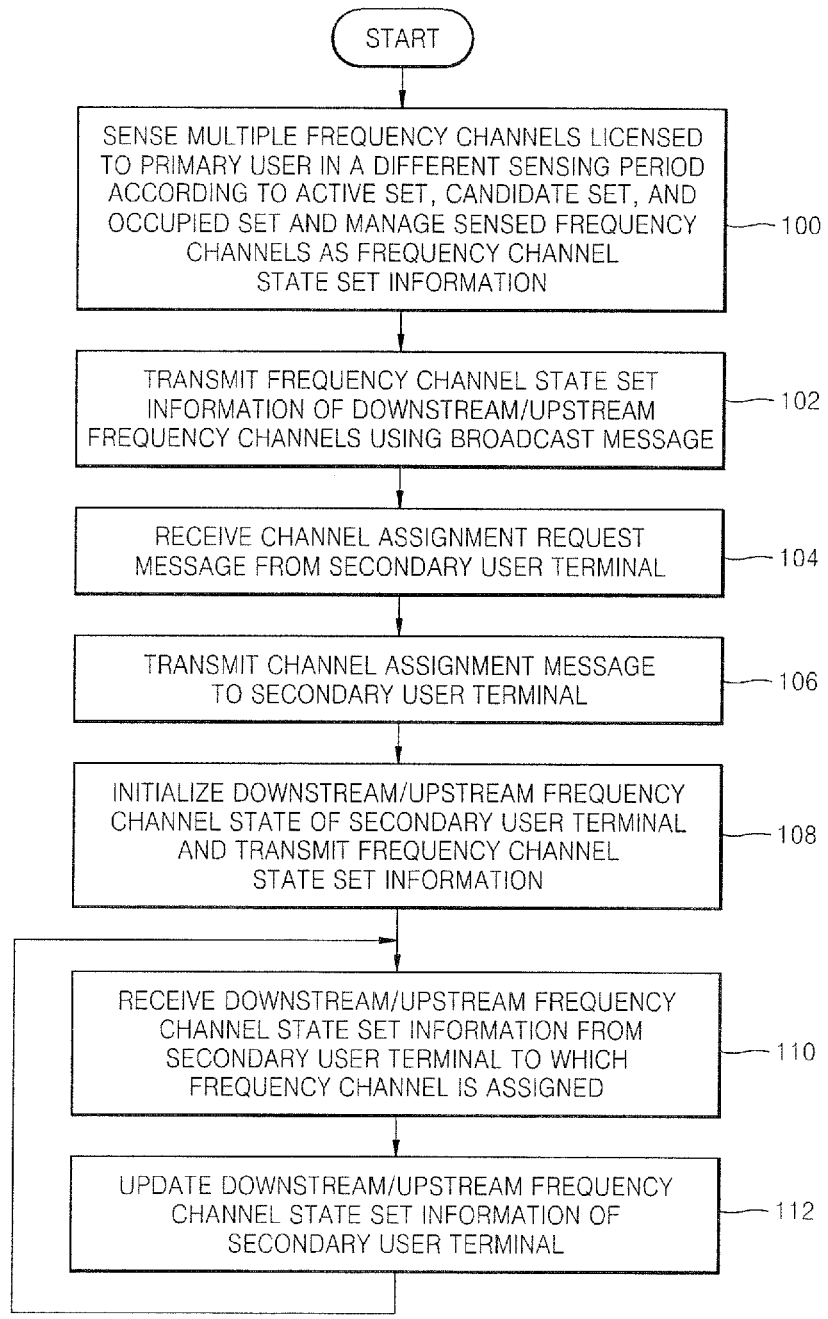
FIG. 2 is a flowchart illustrating a method of assigning a frequency channel using efficient spectrum sensing in a Base Station (BS) of a secondary user according to an embodiment of the present invention.

FIG. 2 is a flowchart illustrating a method of assigning a frequency channel using efficient spectrum sensing in a Base Station (BS) of a secondary user according to an embodiment of the present invention.

The BS (this means the BS of the secondary user and is simply called 'BS' hereinafter) periodically performs the spectrum sensing after a communication channel with a secondary user terminal is established. In addition, the BS transmits its frequency channel state set information using a broadcast message to secondary user terminals with which no communication channel is established.

Referring to FIG. 2, the BS classifies multiple frequency channels licensed to a primary user into a plurality of channel state sets according to usage states, periodically senses channel states by changing a sensing period according to types of the classified channel state sets, and manages the sensed channel states as frequency channel state set information in operation 100.

The BS transmits the frequency channel state set information to secondary user terminals using a broadcast message in operation 102. A new secondary user terminal, which has received the broadcast message, transmits a channel assignment request message to the BS for the assignment of a frequency channel.

If the BS receives the channel assignment request message from the new secondary user terminal in operation 104, the BS transmits a channel assignment message to the new secondary user terminal in operation 106. That is, if the BS receives the channel assignment request message from the new secondary user terminal, the BS can assign at least one downstream and upstream frequency channel to the new secondary user terminal. The BS assigns an unused frequency channel from among frequency channels licensed to the primary user to the new secondary user terminal using the frequency channel state set information.

When the new secondary user terminal transmits the channel assignment request message to the BS, the new secondary user terminal performs ranging, authentication, and registration processes and then transmits the channel assignment request message to the BS using an upstream channel used to perform the three processes.

After assigning the frequency channel to the new secondary user terminal, the BS initializes a downstream/upstream frequency channel state set for the new secondary user terminal to which the frequency channel has been assigned and transmits the frequency channel state set information to the new secondary user terminal in operation 108. Thereafter, the BS sets a periodic spectrum sensing mode for the new secondary user terminal to which the frequency channel has been assigned.

In the periodic spectrum sensing mode, the new secondary user terminal transmits downstream/upstream frequency channel state set information scanned and updated by the new secondary user terminal to the BS. That is, in operation 110, the BS receives downstream/upstream frequency channel state set information from the new secondary user terminal to which the frequency channel has been assigned, and in operation 112, the BS updates downstream/upstream frequency channel state set information of the new secondary user terminal.

If the appearance of a primary user to the frequency channel assigned to the secondary user terminal is detected by using a process of periodically receiving a report from the secondary user terminal (referred to as operations 110 and 112) or a sensing process of the BS, the BS releases the frequency channel from the secondary user terminal and assigns another frequency channel to the secondary user terminal.

In order for the BS and the secondary user terminal to scan frequency channels belonging to the active set, a quiet period (referring to $T_q$ 202 of FIG. 3) must be set.

Figure 3:
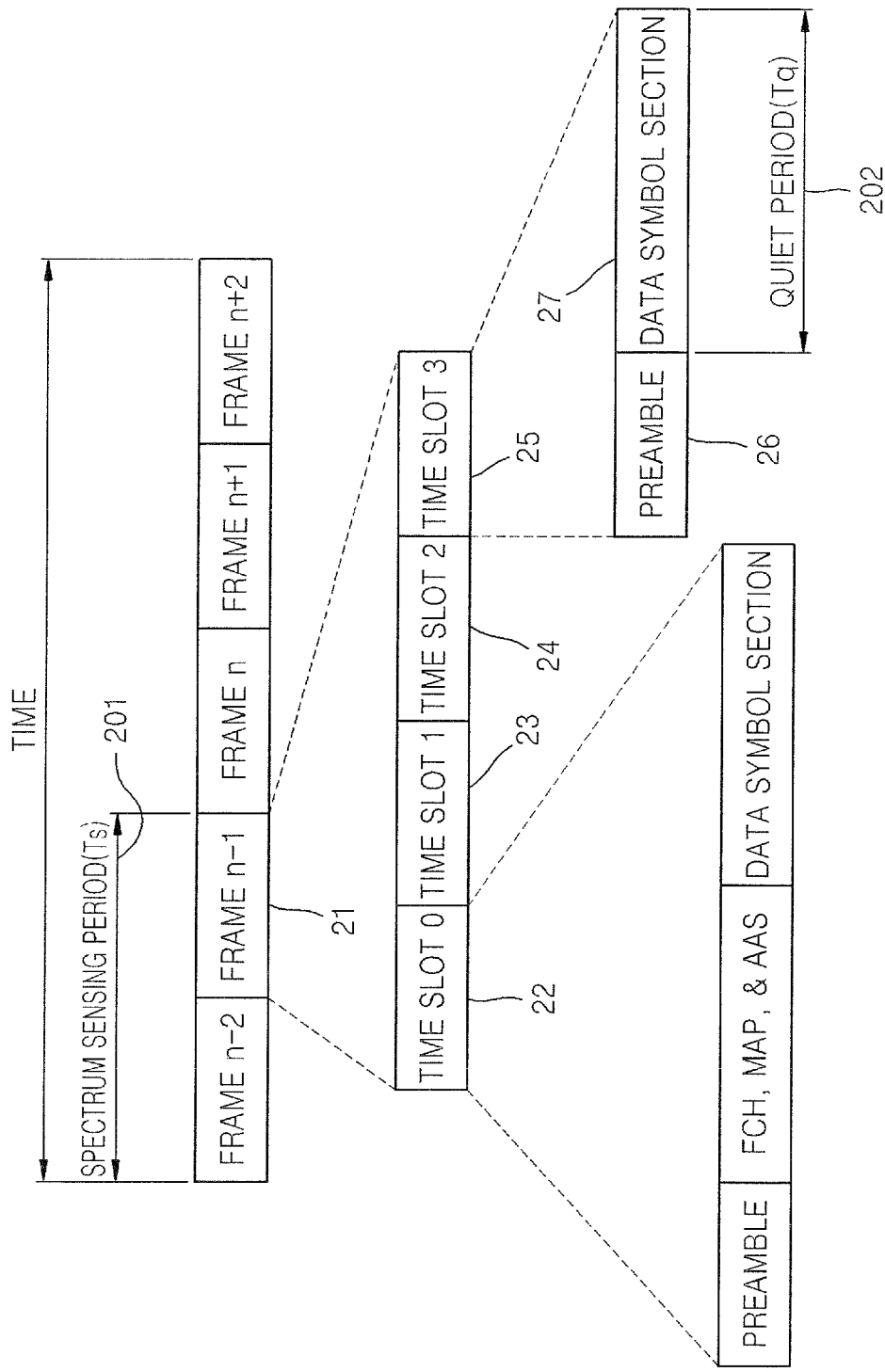
FIG. 3 is a data structure of downstream/upstream frames of a Wireless Regional Area Network (WRAN) according to an embodiment of the present invention.

FIG. 3 is a data structure of downstream/upstream frames of a WRAN system according to an embodiment of the present invention. Referring to FIG. 3, a spectrum sensing period $T_s$ 201 and a quiet period $T_q$ 202 of the active set are set. The quiet period $T_q$ 202 depends on an execution speed of a spectrum sensing algorithm.

The spectrum sensing period $T_s$ 201 must be set to the minimum time for releasing a frequency channel after detecting whether a primary user uses the frequency channel.

FIG. 3 shows a basic frame structure of downstream and upstream frequency channels, wherein a single frame 21 includes 4 time slots 22 through 25. In this time slot structure, a time slot0 22 includes bursts including a broadcast message, and a time slot1 23, a time slot2 24, and a time slot3 25 do not include a broadcast message but include a preamble 26 and a data symbol section 27. In the current embodiment, the quiet period $T_q$ 202 is randomly included in one of the time slot1 23, the time slot2 24, and the time slot3 25.

FIG. 4 is a flowchart illustrating a method of assigning a frequency channel using efficient spectrum sensing in a terminal of a secondary user according to an embodiment of the present invention.

A spectrum sensing method of the secondary user terminal can be classified into two types. The first type is a sensing method used until a communication channel is established after the secondary user terminal is turned on; and the second type is a periodic spectrum sensing method used after the communication channel is established.

Referring to FIG. 4, in an initial spectrum sensing process, when the secondary user terminal selects a downstream frequency channel, the secondary user terminal receives downstream/upstream frequency channel state set information of a BS of the secondary user using a broadcast message of the selected frequency channel in operation 300. The secondary user terminal scans channel states of entire downstream/upstream frequency channels in order to scan channel states of frequency channels around the secondary user terminal, updates the frequency channel state set information received in operation 300 according to the scanning result, and transmits the updated frequency channel state set information to the BS in operation 302.

The secondary user terminal transmits a channel assignment request message to the BS using the frequency channel state set information in operation 304 and receives a channel assignment message from the BS in response in operation 306. At least one downstream and upstream frequency channel is assigned to the secondary user terminal through the channel assignment message.

The secondary user terminal sets a downstream/upstream frequency channel among the at least one downstream and upstream frequency channel assigned by using the channel assignment message and transmits the channel set information to the BS in operation 308.

After the downstream/upstream frequency channel of the secondary user terminal is set, the secondary user terminal performs periodic spectrum sensing (scanning) according to a spectrum sensing period differently set for the active set, the candidate set, the null set, and the occupied set in operation 310. The spectrum sensing (scanning) performed by the secondary user terminal is basically the same as that performed by the BS.

The periodic spectrum sensing performed by the secondary user terminal is accomplished by performing the following procedures.

The secondary user terminal performs spectrum scanning of the active set, the candidate set, the null set, and the occupied set according to different sensing periods in operation 310. The secondary user terminal updates channel states of the active set, the candidate set, and the occupied set according to the scanning result in operation 312. The secondary user terminal reports the updated frequency channel state set information to the BS and reports channel numbers and measured levels of the active set and a maximum of up to 5 selected candidate sets to the BS in operation 314. Operations 310 through 314 are repeatedly performed. Thus, the BS updates frequency channel state set information using the reported information.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of transmitting channel information for frequency channel assignment in a Base Station (BS), the method comprising:
   maintaining information on a plurality of channel sets including an active set currently used for wireless regional area network (WRAN) communication, a candidate set available for WRAN communication, and an occupied set occupied by incumbent;
   transmitting information on the candidate set to a new customer premise equipment (CPE), wherein the BS receives channel sensing information including channel state set information from the CPE for assigning a channel to one of the plurality of channel sets,
   wherein a duration of a sensing period is modified based on a type of a channel set among the plurality of channel sets.

2. A method of receiving channel information for frequency channel assignment in a customer premise equipment (CPE), the method comprising:
   receiving information on a candidate set among a plurality of channel sets including an active set, the candidate set, and an occupied set from a base station (BS), wherein the BS receives channel sensing information including channel state set information from the CPE for assigning a channel to one of the plurality of channel sets,
   wherein the active set is a set of channels currently used for wireless regional area network (WRAN) communication,
   wherein the candidate set is a set of channels available for WRAN communication,
   wherein the occupied set is a set of channels occupied by incumbent,
   wherein a duration of a sensing period is modified based on a type of a channel set among the plurality of channel sets.

3. A channel assignment method applied to a Base Station (BS) of a secondary user to which a frequency channel licensed to a primary user is assigned in a multiple Frequency Assignment (FA) system, the method comprising:
   receiving a channel assignment request message from a new secondary user terminal; and
   assigning an unused frequency channel from among frequency channels licensed to the primary user to the new secondary user terminal using the frequency channel state set information,
   wherein the frequency channel state set information comprises an active set which is a set of frequency channels assigned to the secondary user, a candidate set which is a set of frequency channels unused by the primary user and not assigned to any secondary user, an occupied set which is a set of frequency channels used by primary users, and a null set which is a set of frequency channels allowed but not belonging to any of the active set, the candidate set, and the occupied set, wherein the frequency channels licensed to the primary user are sensed by a spectrum sensing and a duration of a sensing period is modified based on the frequency channel state set information.

4. A channel assignment method applied to a secondary user terminal to which a frequency channel licensed to a primary user is assigned in a multiple Frequency Assignment (FA) system, the method comprising:
   requesting the BS to assign the channel; and
   receiving an information about the channel assignment from the BS,
   wherein the secondary user terminal is assigned with an unused frequency channel from among frequency channels licensed to the primary user by BS referring to frequency channel state set information of multiple frequency channels licensed to the primary user,
   and wherein the frequency channel state set information comprises an active set which is a set of frequency channels assigned to the secondary user, a candidate set which is a set of frequency channels unused by the primary user and not assigned to any secondary user, an occupied set which is a set of frequency channels used by primary users, and a null set which is a set of frequency channels allowed but not belonging to the active set, the candidate set, or the occupied set, wherein the frequency channels licensed to the primary user are sensed by a spectrum sensing and a duration of a sensing period is modified based on the frequency channel state set information.

* * * * *